United States Patent [19]

Kishida et al.

[11] Patent Number: 4,579,099
[45] Date of Patent: Apr. 1, 1986

[54] AIR INTAKE SIDE SECONDARY AIR SUPPLY SYSTEM FOR AN INTERNAL COMBUSTION ENGINE

[75] Inventors: Eiji Kishida; Yoshinobu Isobe, both of Tokyo; Hiroaki Iwasaki, Niiza, all of Japan

[73] Assignee: Honda Giken Kogyo Kabushiki Kaisha, Tokyo, Japan

[21] Appl. No.: 699,534

[22] Filed: Feb. 8, 1985

[30] Foreign Application Priority Data

Feb. 15, 1984 [JP] Japan .................................. 59-027931

[51] Int. Cl.$^4$ .......................................... F02M 23/04
[52] U.S. Cl. ..................................... 123/589; 123/339
[58] Field of Search ................................ 123/585–589, 123/339

[56] References Cited

U.S. PATENT DOCUMENTS

| | | |
|---|---|---|
| 4,083,341 | 4/1978 | Brettschneider et al. .......... 123/589 |
| 4,091,783 | 5/1978 | Laprade et al. ....................... 123/589 |
| 4,192,140 | 3/1980 | Yamashita et al. .................. 123/589 |
| 4,483,308 | 11/1984 | Hasegawa ............................ 123/589 |
| 4,495,922 | 1/1985 | Fujimura et al. .................... 123/589 |
| 4,503,834 | 3/1985 | Hasegawa ............................ 123/589 |

Primary Examiner—William A. Cuchlinski, Jr.
Attorney, Agent, or Firm—Pollock, VandeSande and Priddy

[57] ABSTRACT

The so called air intake side secondary air supply system for an internal combustion engine, having first and second secondary air supply passages leading to an intake air passage on downstream side of a throttle valve is, provided with a delay device in the second secondary air supply passage on upstream side of an open/close valve disposed in the second secondary air supply passage, a pressure supply passage which provides communication between a pressure chamber of an air control valve disposed in the first secondary air supply passage and a part of the second secondary air supply passage between the delay device and the open/close valve, and a pressure control means for supplying a pressure capable of reducing an opening degree of the air control valve into a part of the second secondary air supply passage between the open/close valve and the delay device in response to a predetermined operating condition of the engine. Thus, a range of the air-fuel ratio control is determined according to the operating condition of the engine.

3 Claims, 3 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air-fuel ratio control system for an internal combustion engine, and more specifically to the so-called air intake side secondary air supply system for an internal combustion engine.

2. Description of Background Information

In an internal combustion engine provided with a three-way catalytic converter in the exhaust system, the air-fuel ratio of the engine is controlled around a stoichiometric value (14.7:1 for example) by a feedback control in accordance with the composition of the exhaust gas and operating conditions of the engine since an optimum operation of the three-way catalytic converter is enabled at the stoichiometric air-fuel ratio. The air intake side secondary air supply system for the feedback control is an example of this type of feedback control system and which is constructed such that an air intake side secondary air supply passage leading to downstream side of the throttle valve is provided. The air fuel ratio control is performed by varying the amount of the secondary air flowing through the air intake side secondary air supply passage.

As an example of the air intake side secondary air supply system, there is a system performing a pneumatic type PI (proportional and integral) control operation which is described in Japanese Patent Application No. 57-2127548 assigned to the same assignee of the present application. In this system, there are provided a pair of air intake side secondary air supply passages, both communicated to the downstream side of the throttle valve. The air-fuel ratio is detected in terms of a exhaused gas oxygen concentration and an air-fuel ratio signal is produced. The comunication through one of the air intake side secondary air supply passages is controlled by means of an open/close valve operated in accordance with the air-fuel ratio signal. The other one of the air intake side secondary air supply passage is provided with an air control valve whose opening degree is controlled by the magnitude of the pressure applied to a pressure chamber thereof. The pressure chamber of the air control valve is supplied with one of first and second control pressure for respectively opening and closing the air control valve so that the area of the other one of the air intake side secondary air supply passages is gradually increased or decreased.

With this type of arrangement, the air-fuel ratio is pneumatically controlled throughout a very wide control range.

In this type of air intake side secondary air supply systems, in practice, an additional air control valve was used in the first one of the air intake side secondary air supply passages so as to control the amount of the secondary air flowing therethrough in time periods when the open/close valve is opened. In addition, it was necessary to provide a three-way solenoid valve in order to introduce one of the first and second control pressure into the pressure chamber of the air control valve disposed in the second one of the air intake side secondary air supply passages. Thus, the problem of this type of pneumatic system was that a number of parts are required and the construction becomes complicated.

Thus, it is desired to provide a relatively low cost system of pneumatic type even though this type of systems do not cost higher than conventional air intake side secondary air supply systems of the type of electrically operated PI operation in which the control operations are performed by pulse motors.

Further, it is desirable to determine a range of the air-fuel ratio control according to operating conditions of the engine for improving the driveability of the engine and the efficiency of the purification of the exhaust gas.

An object of the present invention is therefore to provide an air intake side secondary air supply system of the type of pneumatic control which has a relatively simple construction and costs less, while capable of the air-fuel ratio control through a wide range without causing the deterioration of the driveability of the engine.

According to the present invention, the air intake side secondary air supply system includes a detection means for detecting the air-fuel ratio in terms of an oxygen concentration in the exhaust gas, and producing an air-fuel ratio signal, first and second secondary air supply passages, both communicated to the downstream side of the throttle valve. The first secondary air supply passage is provided with an air control valve for controlling the amount of air flow according to the magnitude of the pressure supplied to a pressure chamber thereof and the second secondary air supply passage is provided with an open/close valve operated by an air-fuel ratio signal produced in accordance with an oxygen gas concentration. A delay means is provided in the second secondary air supply passage, on the upstream side of the open/close valve and a pressure supply passage is provided which makes a communication between the pressure chamber of the air control valve and a part of the second secondary air supply passage between the open/close valve and the delay device. The invention features a pressure control means which supplies a pressure capable of reducing the opening degree of the air control valve into a portion of the second air intake side secondary air supply passage between the open/close valve and the delay means during a specific operating condition of the engine.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF A PREFERRED EMBODIMENT

The preferred embodiments of the present invention will be described hereinafter with reference to the accompanying drawings.

Figure 1:
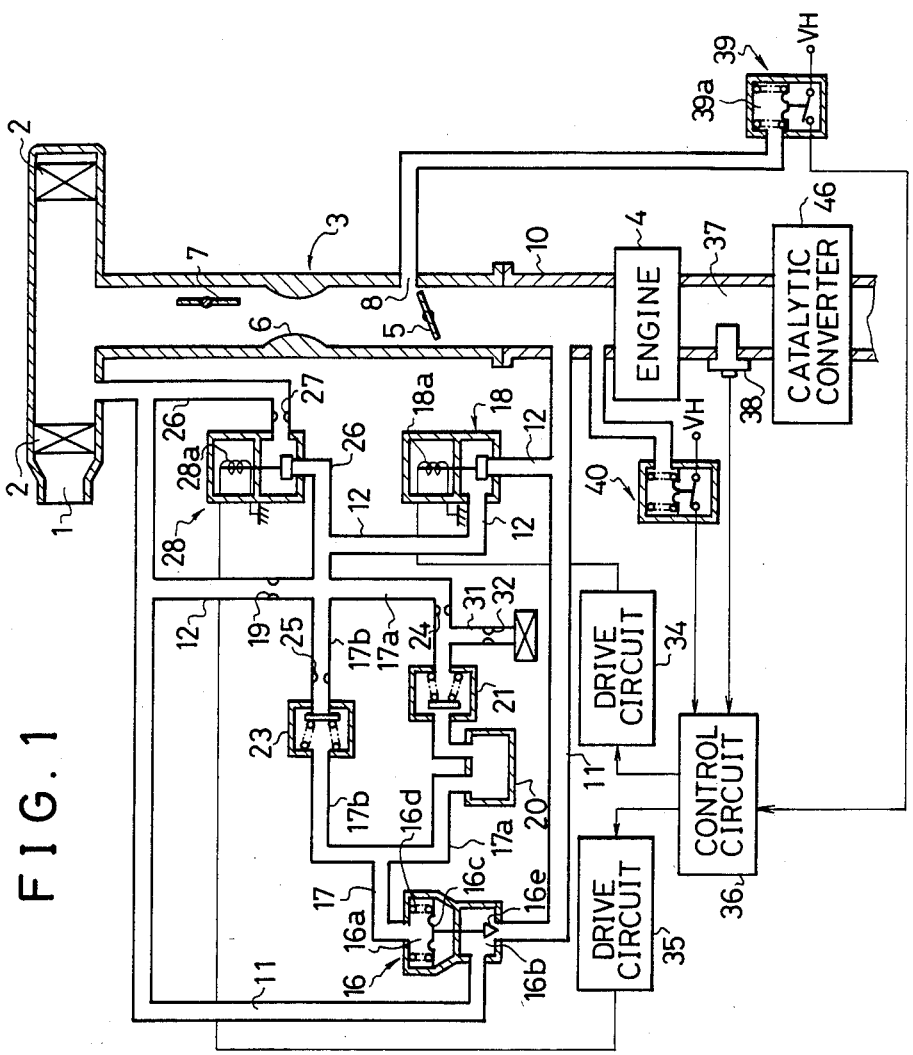
FIG. 1 is a schematic diagram illustrating the construction of an embodiment of the air intake side secondary air supply system according to the present invention.

In FIG. 1, the intake air taken at an atmospheric air inlet port 1 is drawn into an internal combustion engine through an air cleaner 2, and a carburetor 3. The carburetor 3 has a throttle valve 5 and a venturi 6 formed on the upstream side of the throttle valve 5. A choke valve 7 is provided on the upstream side of the venturi 6. In the bore of the carburetor, a vacuum detection hole 8 is provided near the throttle valve 5 in such a manner that it is on the upstream side of the throttle valve 5 when the latter is closed and on the downstream side of the throttle valve 5 when the latter is opened. Intake side secondary air supply passages 11 and 12 are provided to make a communication between the inside of the air cleaner 2 in the vicinity of an air outlet port, and an intake manifold 10, i.e., downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vacuum chamber 16a, so that the area of the passage increases as the magnitude of the vacuum increases.

The air intake side secondary air supply passage 12 is provided with a solenoid valve 18 having a solenoid 18a. When the solenoid 18a is deenergized, the air intake side secondary air supply passage 12 is closed and communication therethrough is made when the solenoid is energized. An orifice 19 is provided in the air intake side secondary air supply passage 12, on the upstream side of the solenoid valve 18. In addition, the air intake side secondary air supply passages 11 and 12 may, as shown, be respectively formed as a shunt passage communicated to the intake manifold 10.

A part of the air intake side secondary air supply passage 12 between the solenoid valve 18 and the orifice 19 is communicated with the presssure chamber 16a of the air control valve 16 by way of a pressure supply passage 17. The vacuum supply passage 17 is provided with parallel shunt portions, i.e., it is divided into two pressure supply passages 17a and 17b. The pressure supply passage 17a is provided with a surge tank 20 and a non-return valve 21 on the side of the air intake side secondary air supply passage 12 from the tank 20. The non-return valve 21 is arranged so as to allow only an air flow from the vacuum chamber 16a directed to the air intake side secondary air supply passage 12, i.e., the vacuum directed to the vacuum chamber 16a. On the other hand, the pressure supply passage 17b is provided with a second non-return valve 23 which is arranged to allow only an air flow directed to the vacuum chamber 16a. In a part of the vacuum supply passages 17a and 17b, on the side of the air intake side secondary air supply passage 12 from the non-return valves 21, 23, there are provided orifices 24 and 25 respectively. A portion of the air intake side secondary air supply passage 12 between the solenoid valve 18 and the orifice 19 is communicated to the inside of the air cleaner 2 where the atmospheric pressure is present, through an atmospheric pressure supply passage 26. The atmospheric pressure supply passage 26 is provided with an orifice 27 and a solenoid valve 28 having a solenoid 28a, on the downstream side of the orifice 27. When the solenoid 28a is deenergized, the solenoid valve 28 closes the atmospheric pressure supply passage 26 and opens it when the solenoid 28a thereof is energized. Further, a portion of the pressure supply passage 17a between the non-return valve 21 and the orifice 24 is communicated to an atmospheric pressure supply passage 31 in which an orifice 32 is provided. In addition, the reference numeral 46 denotes a three-waycatalytic converter disposed in the exhaust system of the engine.

The solenoid 18a of the solenoid valve 18 and the solenoid 28a of the solenoid valve 28 are connected to a control circuit 36 through a drive circuit 34 and a drive circuit 35 respectively. The control circuit 36 is further provided with an output signal of an oxygen sensor 38 which is mounted in an exhaust manifold 37 and produces an output signal having a level $VO_2$ corresponding to an oxygen concentration of an exhaust gas and which increases with the oxygen concentration. In addition to the drive circuits 34, 35 and oxygen sensor 38, a Pc vacuum switch 39 and a $P_B$ vacuum switch 40 are connected to the control circuit 36. The Pc vacuum switch 39 turns "on" when the magnitude of the vacuum Pc supplied to a vacuum chamber 39a thereof is smaller than a predetermined level $P_1$ (30 mmHg for example). Similarly, the $P_B$ vacuum switch 40 turns "on" when the magnitude of the vacuum $P_B$ within the intake manifold 10 becomes lower than a predetermined level $P_2$ (450 mmHg for example). When the vacuum switch 39 (or 40) is turned "on", it produces a high level signal having a voltage $V_H$ which, in turn, is supplied to the control circuit 36.

Figure 2:
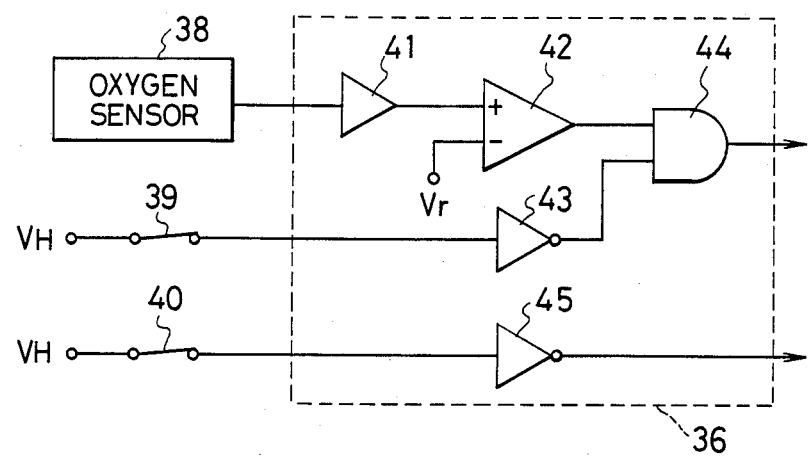
FIG. 2 is a block diagram showing the construction of the control circuit 36 of the system shown in FIG. 1.

As shown in FIG. 2, the control circuit 36 is made up of a comparator 42 for comparing the output signal $VO_2$ of the oxygen sensor 38 through a buffer 41 with a predetermined reference voltage Vr corresponding to a stoichiometric value of air-fuel ratio, an inverter 43 connected to an output terminal of the Pc vacuum switch 39, and an AND circuit 44 for the calculation of the logical AND between the output signal of the comparator 42 and the output signal of the inverter 43, and an inverter 45 connected to an output terminal of the PB vacuum switch 40. An output signal of the AND circuit 44 is supplied to the drive circuit 34 and an output signal of the inverter 45 is supplied to the drive circuit 35.

The operation of the air intake side secondary air supply system of the invention having the above construction will be explained hereinafter.

In the control circuit 36, when the air-fuel ratio is rich, the output signal level $VO_2$ of the oxygen sensor 38 becomes equal to or higher than the reference level Vr ($VO_2 \geq Vr$). Therefore, the comparator 42 produces a high level output signal. Conversely, when the air-fuel ratio is lean, the output signal level $VO_2$ of the oxygen sensor 38 becomes lower than the reference voltage Vr ($VO_2 < Vr$). In this condition, the comparator 42 produces a low level output signal. During a normal operating condition of the engine where the engine has warmed up, the vacuum switch 39 is in the "off" position. Therefore the output signal of the inverter 43 has the high level in this state. Accordingly, the variation of the level of the output signal of the AND circuit 44 becomes identical with the variation of the level of the output signal of the comparator 42. Thus, when the rich air-fuel mixture is detected in terms of the level of the output signal of the oxygen sensor 38, the AND circuit 44 produces the high level output signal which in turn is supplied to the drive circuit 34 as a rich signal. When the air-fuel ratio is detected to be lean in terms of the output signal of the oxygen sensor 38, the AND circuit 44 produces a low level output signal to be supplied to the drive circuit 34 as a lean signal.

When the rich signal is applied to the drive circuit 34, the solenoid 18a is energized to open the solenoid valve 18. Thus, the communication through the air intake side secondary air supply passage 12 is made. Conversely, when the lean signal is supplied to the drive circuit 34, the solenoid 18a of the solenoid valve 18 is deenergized to close solenoid valve 18, which, in turn, stops the communication through the air intake side secondary air supply passage 12.

On the other hand, when the opening angle of the throttle valve is relatively small under a low load condition of the engine such as in the "cruising" state, the magnitude of the vacuum $P_B$ within the intake manifold 10 becomes higher than a predetermined pressure value P2, which, in turn, causes the "turn off" of the $P_B$ vacuum switch 40. With the "turning off" of the $P_B$ vacuum switch 40, the signal level at the input of the inverter 45 becomes low, and the high level signal is supplied to the drive circuit 35 from the inveter 45. As a result, the solenoid valve 28 is opened by the drive circuit 35, and the communmication through the atmospheric pressure supply passage 26 is made.

When, on the other hand, the opening angle of the throttle valve 5 becomes large such as in an acceleration operation, the magnitude of the vacuum $P_B$ within the intake manifold 10 becomes lower than the predetermined pressure value P2, and the $P_B$ vacuum switch 40 turns "on". With the "turning on" of the $P_B$ vacuum switch 40, the input signal level of the inverter 45 becomes high, and the inverter 45 provides a low level signal to the drive circuit 35. Thus, the drive circuit 35 stops the opening the solenoid valve 28, and as a result, the communication through the atmospheric pressure supply passage 26 is stopped.

In response to the opening of the solenoid valve 18 from the closed state during the closure of the solenoid valve 28, the communication through the air intake side secondary air supply passage 12 is made and the secondary air is introduced into the intake manifold 10 through the orifice 19 of the air intake side secondary air supply passage 12 and the electro-magnetic valve 18. On the other hand, vacuum $P_B$ within the intake manifold 10 is supplied to the vacuum chamber 16a through the solenoid valve 18 of the air intake side secondary air passage 12, the orifice 24 of the pressure supply passage 17a, the non-return valve 21, and the surge tank 20. Since the pressure within the vacuum chamber 16a gradually increases to reach the vacuum $P_B$ due to the effect of the residual pressures in the vacuum chamber 16a and the surge tank 20, and the effect of the orifice 24, the opening degree of the air control valve 16, that is, the sectional area of the air intake side secondary air supply passage 11 gradually increases. Thus, the amount of the air intake side secondary air is gradually increased. In this way, the secondary air respectively flowing through the air intake side secondary air supply passages 11 and 12 are added together and then supplied to the engine 4, to shift the air-fuel ratio to the lean side. The amount of the secondary air supplied to the engine gradually increases with time. In this state, since the non-return valve 23 is closed by the vacuum $P_B$, the pressure supply passage 17b is closed. The vacuum $P_B$ is diluted by the atmospheric air flowing into the air intake side secondary air supply passage 12 from the air cleaner 2 and the atmospheric pressure supply passage 31. Degree of the dilution is determined in accordance with the size of the orifices 19 and 32 and thus a fluctuation of the vacuum $P_B$ to be supplied to the pressure chamber 16a of the air control valve 16 of a large magnitude is prevented.

When, on the other hand, the solenoid valve 18 is closed from the open state under a condition where the solenoid valve 28 is closed, the air intake side secondary air supply passage 12 is closed immediately. Therefore, the atmospheric pressure is supplied to the vacuum chamber 16a through the orifice 19 of the air intake side secondary air supply passage 12, orifice 25 and the non-return valve 23 of the pressure supply passage 17b. Since the pressure in the vacuum chamber 16a rapidly approaches to the atmospheric pressure level without being affected by the residual vacuum of the surge tank 20, the opening degree of the air control valve 16, that is, the sectional area of the air intake side secondary air supply passage 11 rapidly decreases to reduce the amount of the air intake side secondary air. Therefore, when the air intake side secondary air supply passage 12 is closed, the secondary air is still supplied to the engine 4 through the air intake side secondary air supply passage 11 and the amount of the secondary air supply is gradually decreased with time.

When the solenoid valve 18 is closed, the non-return valve 21 is closed by the atmospheric pressure to be supplied to the vacuum chamber 16a and, in turn, the pressure supply passage 17a is closed. Thus, the atmospheric pressure is supplied to the vacuum chamber 16a without passing through the surge tank 20, resulting in a speed of the decrease of the air intake side secondary air which is faster than the speed of the increase thereof.

Therefore, when the air-fuel ratio is controlled by a feedback control operation, the rich signal and the lean signal is produced alternately and wihtout interruption irrespective of the opening and closure of the solenoid valve 28. Therefore, in the air intake side secondary air supply passage 11, the amount of the secondary air is increased during the presence of the rich signal, and decreased during the presence of the lean signal. Thus, the integral (I) control is performed. In the air intake side secondary air supply passage 12, the secondary air flows intermittently and the proportional control (P) takes place. Therefore, the amount of the secondary air supplied to the intake manifold becomes a sum of the proportional control and the integral control.

On the other hand, when the solenoid valve 18 is opened from the closed state under a condition where the solenoid valve 28 is open, the secondary air flows through the orifice 19 of the air intake side secondary air supply passage 12. Also, the secondary air flows through the orifice 27 of the atmospheric pressure supply passage 26 and meets the other flow of the secondary air at a junction point on the downstream side of the orifice 19 of the air intake side secondary air supply passage 12. Then the flow is introduced into the intake manifold 10 through the solenoid valve 18. It will be noted that the amount of the air intake side secondary air introduced into the intake manifold 10 through the air intake side secondary air supply passage 12 is increased by an amount corresponding to the area of the orifice 27 as compared with an amount with the closed solenoid valve 28. Under this condition, the vacuum $P_B$ supplied to the vacuum chamber 16a through the air intake side secondary air supply passage 12 and the pressure supply passage 17a is diluted by the atmospheric air introduced through the part of the the air intake side secondary air supply passage 12 on the side of the air cleaner 2, and the atmospheric pressure supply passage 31, as well as the atmospheric air introduced through the atmospheric pressure supply passage 26. The degree of dilution is determined by the size of the orifice 19, 27, and 32.

Thus, the degree of dilution becomes greater as compared with the time when the solenoid valve 28 is closed. Therefore, the speed of variation of the pressure within the pressure chamber 16a to the pressure $P_B$ is decreased, and the speed of the increase of the opening degree of the air control valve 16 is also reduced. As a result, the speed of the increase of the amount of the air intake side secondary air introduced into the intake manifold 10 through the air intake side secondary air supply passage 11 becomes slow as compared with the speed obtained with the closed solenoid valve 28.

When the solenoid valve 18 is closed from the open state under a condition of the open solenoid valve 28, the air intake side secondary air supply passage 12 is closed immediately and the atmospheric air flows into the junction on the downstream side of the orifice 19 through the orifice 19 of the air intake side secondary air supply passage 12 and the orifice 27 of the atmosperic pressure supply passage 26. Then the atmospheric air is supplied to the pressure chamber 16a through the orifice 25 and the non-return valve 23 of the pressure supply passage 17b. In this state, the residual vacuum in the surge tank has practically no effect on the pressure in the pressure chamber 16a, and the latter approaches to the atmospheric pressure by the atmospheric pressure through the atmospheric pressure supply passage 26 by far faster than the case with the closed solenoid valve 28. Thus, the speed of the decrease of the opening degree of the air control valve is increased. Therefore, the speed of the decrese of the amount of the air intake side secondary air flowing into the intake manifold through the air intake side secondary air supply passage 11 becomes higher than the case with the closed solenoid valve 28.

In this way, under the condition where the solenoid valve 28 is open, the proportion of the proportional control is made larger than that of the integral control by means of the secondary air supplied through the orifice 27 and also the proportion of the integral control is reduced by the increase of the degree of the dilution of the vacuum supplied to the vacuum chamber 16a. Thus, substantially only the proportional control is effected under this condition.

When, on the other hand, the operating state of the engine 4 is switched, for example, to a decelerating state as the result of the closure of the throttle valve 5, the magnitude of the vacuum Pc supplied from the vacuum detection hole 8 to the vacuum switch 39 becomes smaller than the predetermined level and a high level output signal of the vacuum switch 39 is applied to the inverter 43. As a result, the output signal level of the inverter 43 turns to the low level. In this state, the AND circuit 44 provides the low level signal to the driving circuit 34 regardless of the level of the output signal of the comparator 42, that is, the output signal level of the oxygen sensor 38. The drive circuit 34 in turn stops the operation of the solenoid valve 18 as in the case in which the lean signal is applied thereto. Thus, the solenoid valve 18 remains closed. With the closed solenoid valve 18, the atmospheric pressure is continuously supplied to the vacuum chamber 16a of the air control valve 16, and the air intake side secondary air passages 11 and 12 are closed. Thus, the feedback control of the air-fuel ratio is stopped.

Figure 3:
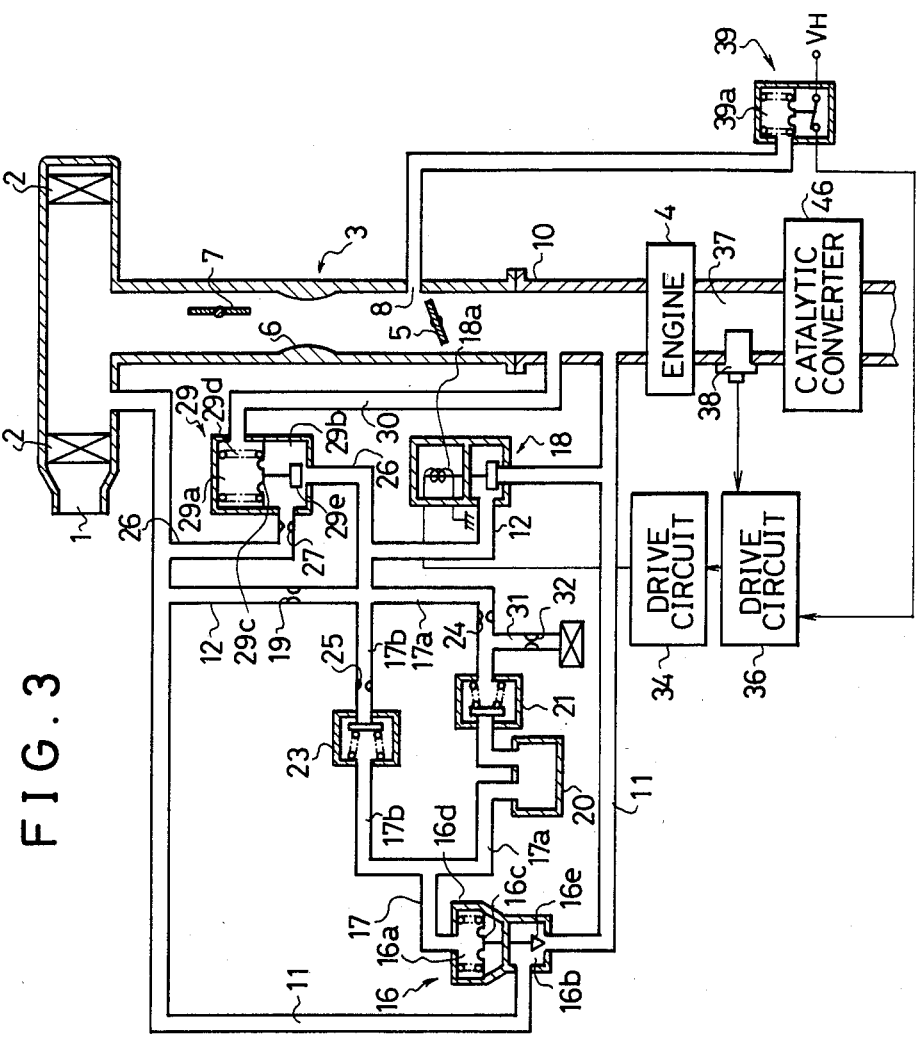
FIG. 3 is a schematic diagram of another embodiment of the air intake side secondary air supply system according to the present invention.

FIG. 3 is a schematic diagram of another embodiment of the present invention.

This embodiment features that a vacuum responsive open/close valve is disposed in the atmospheric pressure supply passage 26, on the downstream side of the orifice 27, in place of the solenoid valve 28 of the embodiment of FIG. 1.

The vacuum responsive open/close valve 29 consists of a vacuum chamber 29a, a valve chamber 29b, a diaphragm 29c, a valve spring 29d, and a plate like valve element 29e. The vacuum responsive open/close valve is so constructed that it opens when the magnitude of vacuum within the vacuum chamber 29a becomes greater than a predetermined level $P_2$ and it closes when the latter becomes smaller than the predetermined level $P_2$. The vacuum chamber 29a is communicated with the intake manifold 10 through a vacuum supply passage 30. With this construction, the vacuum responsive open/close valve 29 functions substantially in the same manner as the solenoid valve 28. Since the construction of the other portions of the system is the same as the previous embodiment, the explanation thereof is not made here. However, it will be appreciated that substantially the same operation as the first embodiment of FIG. 1 is performed in the case of this embodiment.

Thus, according to the the present invention, two air intake side secondary air supply passages both leading to the intake air passage on the downstream side of the throttle valve is provided and one of the air intake side secondary air supply passages is provided with an open/close valve being operated in accordance with an air-fuel ratio signal and a delay device disposed on the upstream side of the open/close valve. The other one of the air intake side secondary air supply passage is provided with an air control value whose opening degree is controlled in accordance with the pressure applied to the pressure chamber thereof, and the communication between the pressure chamber of the air control valve and a part of the secondary air supply passage on the upstream side of the open/close valve is provided. When the open/close valve is opened, the vaccum in the intake manifold, on the downstream side of the throttle valve, is supplied to the pressure chamber, and the atmospheric pressure is supplied to the pressure chamber when the open/close valve is closed. The opening degree of the air control valve is basically controlled in this way and in predetermined operating states of the engine, a pressure for decreasing the opening degree of the air control valve such as the atmospheric pressure is supplied to the first one of the air intake side secondary air supply passage at a position between the open/close valve and the delay means, using a pressure control means. Thus, one of the air intake side secondary air supply passages is utilized also for supplying the vacuum and the open/close valve is utilized as a means for switching the pressure into the pressure chamber of the air control valve. In view of the above, it will be noted that the air intake side secondary air supply system according to the present invention performs the air-fuel ratio control of the PI operation type using a relatively simple contruction as the pneumatic system. Thus the cost of the system is reduced.

Further, there is an advantage that a broader control range of the air-fuel ratio as compared with the conventional system is enabled. As a result, the amount of undesirable components in the exhaust gas, especially CO (Carbon Monoxide) and HC (Hydrocarbon), generated during the high load operations of the engine, is reduced. Additionally, with the operation o.f the pressure control means, the air-fuel ratio will become controlled by almost only proportional control process and the base value of the air-fuel ratio can be varied, for example, from 13.0 through 14.5 in an operating condition of the engine such as in the cruising state. Thus, the driveability of the engine can be improved.

Additionary, when each of the pressure supply passage for introducing the vacuum and the presssure supply passage for introducing the atmospheric pressure into the pressure chamber of the air control valve is provided with an orifice and one of the pressure supply passages is provided with a surge tank as the above described embodiment, an integral control which is appropriate with respect to the operating conditions of the engine is enabled. This is because the speed of the increasing and decreasing of the opening degree of the air control valve are arbitrarily determined by varying the size of the orifices and according to the presence or absence of the surge tank.

What is claimed is:

1. An air intake side secondary air supply system for an internal combustion engine having a carburetor and intake air passage with a throttle valve, comprising:

an air-fuel ratio detection means for detecting an air-fuel ratio from an oxygen concentration of an exhaust gas of the engine and producing an air-fuel ratio signal;

a first air intake side secondary air supply passage leading to the intake air pasage on downstream side of the carburetor and the throttle valve;

an air control valve disposed in said first air intake side secondary air supply passage and adapted to vary a sectional area of the first air intake side secondary air supply passage in accordance with a magnitude of a pressure supplied to a pressure chamber thereof;

a second air intake side secondary air supply passage leading to the intake air passage on downstream side of the carburetor and the throttle valve;

a first open/close valve disposed in said second air intake side secondary air supply passage and opening and closing same in accordance with a content of said air-fuel ratio signal;

a first air supply delay means disposed in said second air intake side secondary air supply passage on upstream side of said first open/close valve;

a pressure supply passage for providing communication between said pressure chamber of the air control valve and a part of said second air intake side secondary air supply passage between said first open/close valve and said first air supply delay means; and a pressure control means responsive to a predetermined operating condition of the engine, for supplying a pressure capable of reducing an opening degree of said air control valve into said part of second air intake side secondary air supply passage between said first open/close valve and said first air supply delay means when the engine is operating under said predetermined operating condition.

2. An air intake side secondary air supply system as set forth in claim 1, wherein said predetermined operating condition of the engine is a low load condition of the engine.

3. An air intake side secondary air supply system as set forth in claim 1, wherein said pressure control means comprises an atmospheric pressure supply passage communicated to a part of said second air intake side secondary air supply passage between said first open/close valve and said first air supply delay means and a second open/close valve disposed in said atmospheric pressure supply passage and being controlled to open when the engine is operating under said predetermined operating condition, and a second air supply delay means provided in said atmospheric pressure supply passage.

* * * * *